US005445355A

United States Patent [19]

Chen

[11] Patent Number: 5,445,355

[45] Date of Patent: Aug. 29, 1995

[54] ANTENNA-MOUNTING DEVICE

[76] Inventor: Hung-ming Chen, 3Fl., No. 22, Lane 167, Jenyi St., Shanchung City, Taipei Hsien, Taiwan

[21] Appl. No.: 245,221

[22] Filed: May 17, 1994

[51] Int. Cl.$^{6}$ .............................................. F16M 13/00

[52] U.S. Cl. .................................... 248/514; 343/713; 343/715; 343/880; 24/540

[58] Field of Search ............... 343/880, 713, 715, 878, 343/882, 888; H01Q 7/08, 7/12; 24/540, 541; 248/514, 515, 539, 503

[56] References Cited

U.S. PATENT DOCUMENTS

| | | | |
|---|---|---|---|
| 4,149,694 | 4/1979 | Verini | 343/715 X |
| 4,150,381 | 4/1979 | Verini | 343/715 |
| 4,194,208 | 3/1980 | Eveloff | 343/715 |
| 4,692,770 | 9/1987 | Kadokara | 343/715 |

*Primary Examiner*—Donald Hajec
*Assistant Examiner*—Tho Phan
*Attorney, Agent, or Firm*—Hedman, Gibson & Costigan

[57] ABSTRACT

An antenna-mounting device includes a mount and a quick-release clip joined with the mount. An antenna is attached to the mount. The quick-release clip includes a first member and a second member. The first member includes a first margin and a second margin which is curved so as to form a lower jaw, two spaces defined therein and two tabs which perpendicularly project from the first member so that the spaces are between the tabs. The second member includes a margin disposed above the lower jaw. A pad includes a first portion adhered to the first margin of the first member and a second portion adhered to the second member. A buckle includes two tabs which perpendicularly project from the buckle and each define a pivot point which is linked to one of the tabs of the first member, a first edge and a second edge, so that a distance between the first edge and the pivot point is less than a distance between the second edge and the pivot point. The buckle is switched between a released position and locked position. In the released position, the upper jaw is released from the lower jaw receiving a trunk lid. In the locked position, the second edges of the tabs of the buckle abut against the second member through the spaces of the first member pushing upper jaw towards the lower jaw, so that the trunk lid is compressed between the upper jaw and the lower jaw.

3 Claims, 4 Drawing Sheets

ANTENNA-MOUNTING DEVICE

BACKGROUND OF THE INVENTION

The present invention relates to an antenna-mounting device which includes a mount and a quick-release clip.

A car is equipped with a wireless apparatus for instant communication. A wireless apparatus needs an antenna for good performance. An antenna is generally mounted on a trunk lid of a car. It is easy for a thief to steal the antenna when the driver is not in the vicinity of the car, so it is necessary for a driver to remove the antenna from the trunk lid and store the antenna in the trunk.

A first conventional antenna-mounting device includes a mount and a magnet which is secured to the mount. An antenna is attached to the mount. The magnet attaches to the mount and the antenna to a trunk lid of a car. The magnet must be strong in order to retain the antenna on the trunk lid. However, the magnet cannot be too strong, otherwise, it cannot be removed from the trunk lid. As those factors conflict with each other, it is difficult for manufacturers to find a good balance therebetween.

A second conentional antenna-mounting device includes a mount and a clamp which is secured to the mount. An antenna is attached to the mount. The clamp includes a first member and a second member which is parallel to the first member in order to receive a trunk lid. The second member defines a plurality of tubular protrusions each defining an aperture. A thread is formed on an internal surface of each aperture. The threads of the bolts are engaged with the threads of the second member. Thus, the trunk lid is retained between the first member and the bolts. However, it is troublesome for a user to disengage the bolts from the trunk lid.

SUMMARY OF THE INVENTION

It is the primary object of the present invention to provide an antenna-mounting device for mounting an antenna on a trunk lid of a car. The antenna-mounting device can be firmly retained on the trunk lid when the antenna is in use. The mount can be easily removed from the trunk lid when the antenna is not in use.

The primary object of the present invention is achieved by providing an antenna-mounting device which uses a mount and a quick-release clip which is secured to the mount. An antenna is attached to the mount. The quick-release clip includes a first member and a second member. The first member includes a first margin and a second margin which is curved so as to form a lower jaw, two spaces defined therein and two tabs which perpendicularly projected from the first member so that the spaces are between the tabs. The second member includes a margin disposed above the lower jaw. A pad includes a first portion adhered to the first margin of the first member and a second portion adhered to the second member. A buckle includes two tabs which perpendicularly project from the buckle and each define a pivot point which is linked to one of the tabs of the first member, a first edge and a second edge, so that a distance between the first edge and the pivot point is less than a distance between the second edge and the pivot point. The buckle can be switched between a released position and locked position. In the released position, the upper jaw is released from the lower jaw in order to receive a trunk lid. In the locked position, the second edges of the tabs of the buckle abut against the second member through the spaces of the first member so as to push the upper jaw towards the lower jaw, so that the trunk lid is compressed between the upper jaw and the lower jaw.

For a better understanding of the present invention and objects thereof, a study of the detailed description of the embodiments described hereinafter should be made in relation to the accompanying drawings.

DETAILED DESCRIPTION OF THE PREFERRED EMBODIMENT

Figure 1:
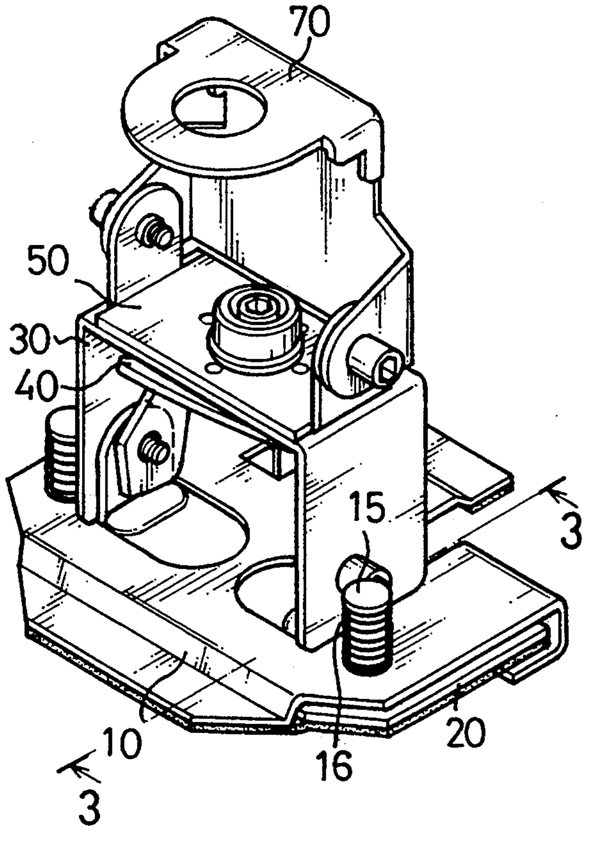
FIG. 1 is a perspective view of an antenna-mounting device which includes a mount and a quick-release clip in accordance with the preferred embodiment of the present invention.
Figure 6:
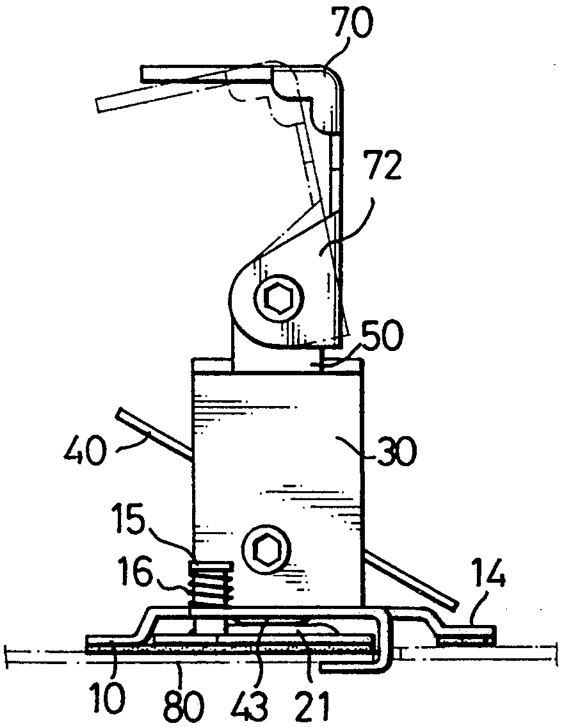
FIG. 6 is a side view of a mount on which an antenna can be pivoted about a horizontal axis.
Figure 3:
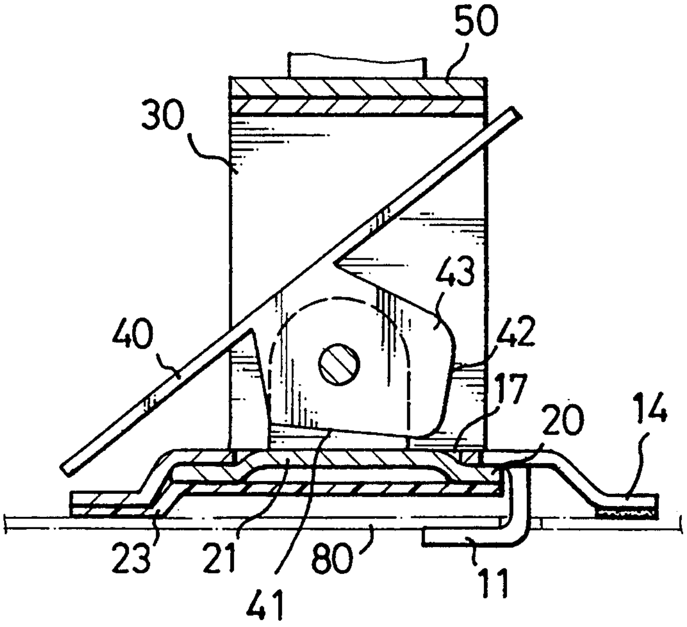
FIG. 3 is a cross-sectional view of a quick-release clip in a released position.

FIG. 1 shows an antenna-mounting device for mounting an antenna on a trunk lid 80 (shown in phantom lines in FIGS. 3 and 6). The antenna-mounting device includes a mount and a clip which is secured to the mount.

Figure 2:
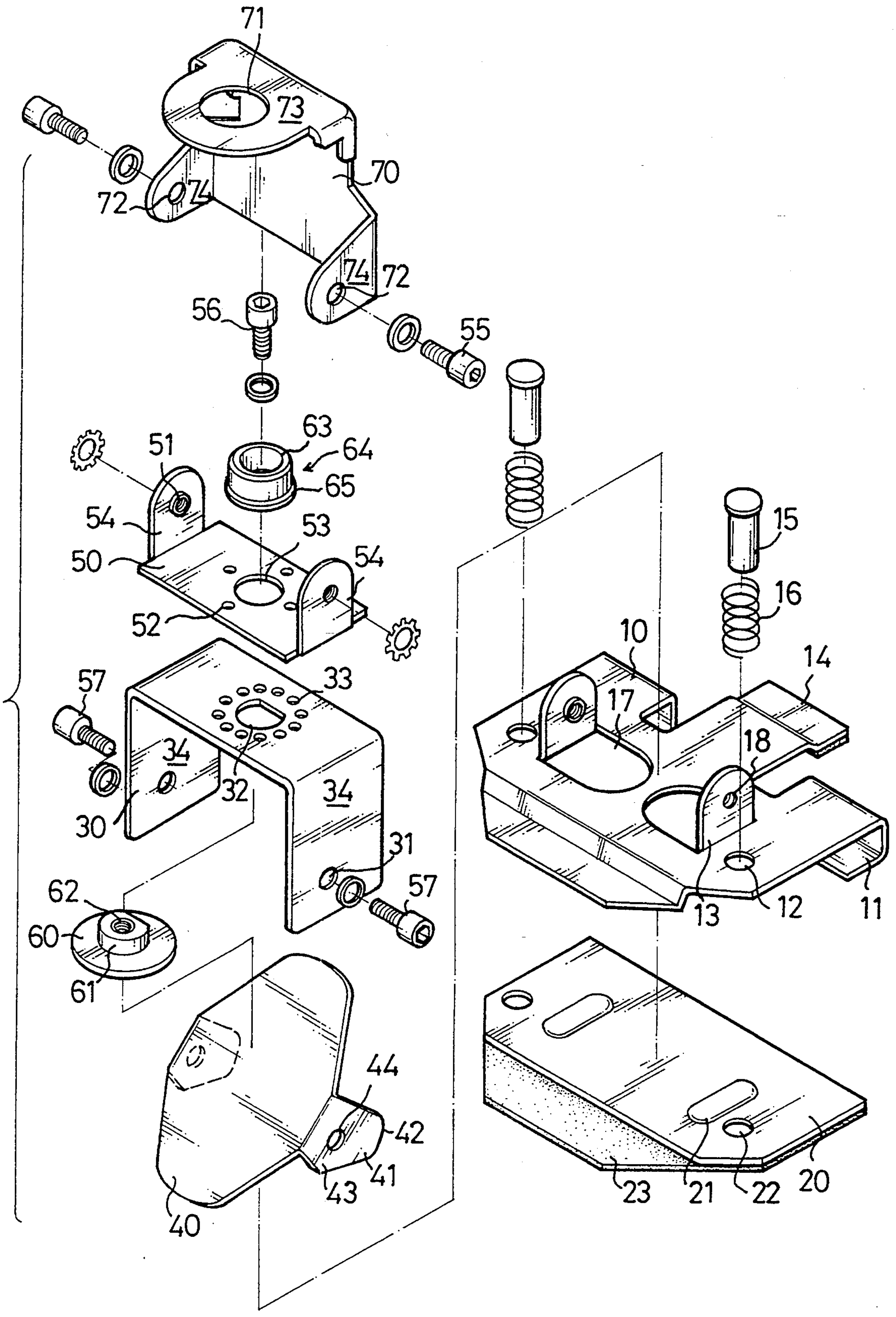
FIG. 2 is an exploded view of an antenna-mounting device in accordance with the preferred embodiment of the present invention.

Referring to FIG. 2, the mount includes an antenna-receiving member 70. The antenna-receiving member 70 includes a plate (not numbered), a top portion 73 which perpendicularly projects from the plate thereof and two tabs 74 which perpendicularly project from the plate thereof. The top portion 73 defines an aperture 71. An antenna (not shown) is inserted through the aperture 71, and is secured to the top portion 73. Each tab 74 defines an aperture 72.

A first joint 50 includes a plate (not numbered) and two tabs 54 which perpendicularly project from the plate thereof. A tubular portion 51 which defines an aperture projects from each tab 54. A thread (not numbered) is formed on an internal surface of each tubular portion 51. The plate of the first joint 50 defines an aperture 53. The plate of the first joint 50 is pressed downwards at a number of points about the aperture 53 so as to from a plurality of downward bosses 52.

To join the antenna-receiving member 70 with the first joint 50, the tabs 54 are disposed between the tabs 74. Two bolts 55 each include a head and a body on which a thread (not numbered) is formed. Each of the two bolts 55 is inserted into one of the apertures 72. The thread of each bolt 55 is engaged with the thread of a tubular portion 51. Thus, the antenna-receiving member 70 and the first joint 50 are joined with each other. The antenna can be pivoted about a horizontal axis (see FIG. 6).

A second joint 30 includes a plate (not numbered) and two tabs 34 which perpendicularly project from the plate thereof. Each tab 34 defines an aperture 31. The plate of the second joint 30 defines an aperture 32 in the form of "D" and a number of recesses 33 about the aperture 32.

A threaded member 58 includes a disk 60 and a boss 61 which projects from the disk 60 and is in the form of "D" in a cross-sectional view. The threaded member 58 defines an aperture 62 which forms a cylindrical wall on which a thread (not numbered) is formed.

A member 64 includes an annular portion 65 and a tubular portion 63 which projects from the annular portion 65. An aperture (not numbered) which is defined in the tubular portion 63 is greater than an aperture (not numbered) which is defined in the annular portion 65.

Figure 5:
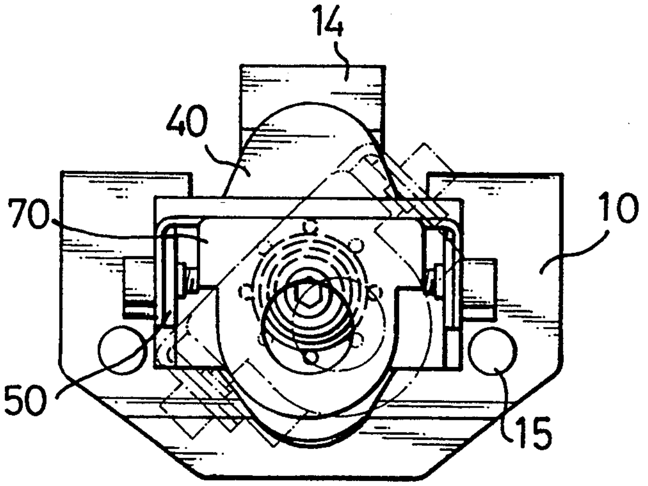
FIG. 5 is a top view of a mount on which an antenna can be pivoted about a vertical axis.

To join the first joint 50 with the second joint 30, the plate of the first joint 50 is disposed on the plate of the second joint 30. The tabs 54 and the tabs 34 project in two opposite directions. The aperture 53 is aligned with the aperture 32. The downward bosses 52 are received in some of the recesses 33. The boss 61 is inserted through the aperture 32, the aperture 53 and the aperture which is defined in the annular portion 65 of the member 64. A bolt 56 includes a head and a body on which a thread is formed. The body of the bolt 56 is inserted through the aperture which is defined in the annular portion 65 of the member 64, so that the thread of the bolt 56 can be engaged with the thread of the threaded member 58. The insertion of the boss 61 in the aperture 32 restrains the relative rotation between the member 58 and the second joint 30 so that a user does not need any tool to retain the member 58 in position when he/she secures the bolt 56 into the threaded member 58. The engagement of the downward bosses 52 with some of the recesses 33 firmly retains the first joint 50 in position relative to the second joint 30. However, the antenna can be pivoted about a vertical axis (see FIG. 5) when the engagement of the thread which is formed on the bolt 56 with the thread which is formed on the member 58 is slackened.

The quick-release clip includes first and second members 10 and 20. The first member 10 includes opposite first and second margins. The second margin of the first member 10 is separated into a middle, tab and two side tabs. The middle tab of the first member 10 acts as an anti-pivot tab 14. Each of the side tab of the first member 10 is curved so as to act as a lower jaw 11. Two press-outs 13 are formed on the member 10, thus defining two spaces 17. A tubular portion 18 which defines an aperture projects from each press-out 13. A thread (not shown) is formed on the internal surface of each tubular portion 18. The member 10 defines two apertures 12 between which the press-outs 13 are located.

A member 20 includes opposite first and second margins. The member 20 is pressed upward at two parallel segments so as to form two parallel ribs 21. The member 20 defines two apertures 22 between which the ribs 21 are located.

A pad 23 includes a first portion and a second portion. The first portion of the pad 23 is adhered to the first margin of the first member 10. The second portion of the pad 23 is adhered to the second member 20. Thus, the first member 10 is joined with the second member 20.

The second margin of the member 20 acts as an upper jaw which is disposed above the lower jaws 11. Two rivets 15 each include an upper enlarged end and a lower enlarged end. Each of the rivets 15 is inserted through one of the apertures 12 and one of the apertures 22 so that the members 10 and 20 are between the upper and lower enlarged ends of each of the rivets 15.

Referring to FIG. 3, a spring 16 is mounted on each of the rivets 15 so that it is compressed between the upper enlarged end of each of the rivets 15 and the member 10.

Referring to FIG. 2, a buckle 40 includes two tabs 43 which perpendicularly project therefrom. Each of the tabs 43 defines an aperture 44, a first edge 41 and a second edge 42, so that the shortest distance from the center of the aperture 44 to the first edge 41 is less than the shortest distance from the center of the aperture 44 to the second edge 42.

Two bolts 57 each include a head and a body on which a thread (not numbered) is formed. Each of the bolts 57 is inserted through one of the apertures 31 and one of the tubular portions 18 so that the thread of the bolt 57 can be engaged with the thread of each of the press-outs 13. Thus, the member 10 and the member 30 are joined with one another. Each of two bolts 57 is further inserted through one of the apertures 44 so that the buckle 40 is pivotally mounted on two bolts 57.

Referring to FIG. 3, the buckle 40 is disposed in a released position so that the first edges 41 are disposed above the ribs 21. Thus, the upper jaw is biased by the springs 16 from the lower jaws 11. A trunk lid 80 is disposed between the upper jaw and the lower jaws 11.

Figure 4:
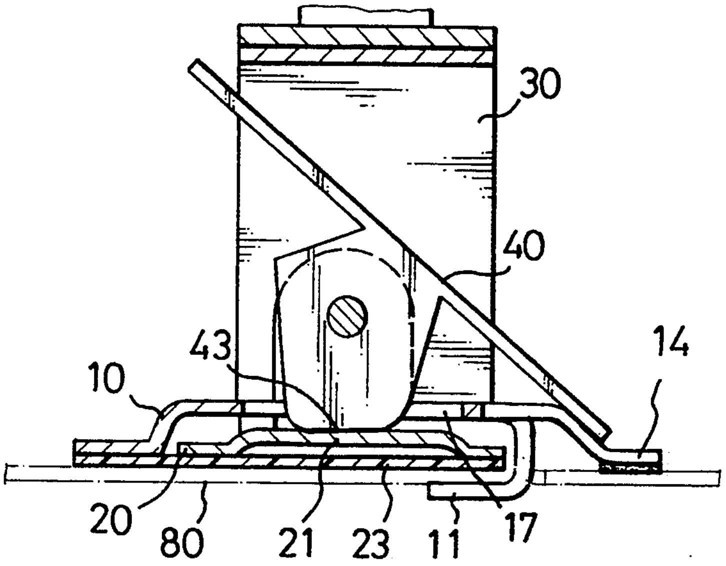
FIG. 4 is a cross-sectional view of a quick-release clip in a locked position.

Referring to FIG. 4, the buckle 40 is pivoted to a locked position so that the second edges 42 are disposed, through the spaces 17, against the ribs 21. Thus, the upper jaw is pushed by the tabs 43 towards the lower jaws 11 so that the trunk lid 80 is sandwiched between the upper jaw and the lower jaws 11. That is, the antenna is firmly mounted on the trunk lid.

Obviously, the quick-release clip can be easily switched between the released position and the locked position by pivoting the buckle 40.

While the present invention has been explained in relation to its preferred embodiment, it is to be understood that variations thereof will be apparent to those skilled in the art upon reading this specification. Therefore, the present invention is intended to cover all such variations as shall fall within the scope of the appended claims.

What is claimed is:

1. An antenna-mounting device comprising:

a mount to which an antenna is attached;

a clip which is joined with the mount and comprises:

- a first member comprising a first margin and a second margin which is curved so as to form a lower jaw, two spaces defined therein and two tabs which perpendicularly project from the first member so that the spaces are between the tabs;
- a second member comprising a margin disposed above the lower jaw, and having an upper jaw;
- a pad comprising a first portion adhered to the first margin of the first member and a second portion adhered to the second member;
- a buckle comprising two tabs which perpendicularly project from the buckle and each define a pivot point which is linked to one of the tabs of the first member, a first edge and a second edge, so that a distance between the first edge and the pivot point is less than a distance between the second edge and the pivot point;

whereby the buckle is switched between a released position and locked position, in the released position, the upper jaw is released from the lower jaw in order to receive a trunk lid, in the locked position, the second edges of the tabs of the buckle abut against the second member through the spaces of the first member so as to push the upper jaw towards the lower jaw, so that the trunk lid is compressed between the upper jaw and the lower jaw.

2. An antenna-mounting device in accordance with claim 1 wherein the first member defines two apertures so that the tabs of the first member are between the apertures, wherein the second member defines two apertures corresponding to the apertures of the first member, the antenna-mounting device comprising two rivets each comprising a first enlarged end and a second enlarged end and two springs, whereby each of the rivets is inserted through one of the apertures of the first member and one of the apertures of the second member, whereby each of the springs is mounted on one of the rivets so that each of the springs is compressed between the first enlarged end of one of the rivets and the first member in order to bias the upper jaw from the lower jaw, so that the first edges of the tabs of the buckle are disposed above the second member so that the upper jaw is biased by the springs from the lower jaw in order to allow a trunk lid to be disposed between the upper jaw and the lower jaw in the locked position.

3. An antenna-mounting device in accordance with claim 1 wherein each of the pivot points is an aperture, wherein each of the tabs of the first member defines an aperture corresponding to the aperture of each of the tabs of the buckle, wherein the antenna-mounting device comprises two bolts each of which is inserted through the aperture of one of the tabs of the buckle and the aperture of one of the tabs of the first member.

* * * * *